M. J. COFFEY.
PIPE COUPLING.
APPLICATION FILED FEB. 5, 1919.

1,310,740. Patented July 22, 1919.

Inventor
Michael J. Coffey,
by Gifford & Bull, His Attorneys

UNITED STATES PATENT OFFICE.

MICHAEL J. COFFEY, OF FREEPORT, NEW YORK, ASSIGNOR TO T. A. GILLESPIE COMPANY, OF NEW YORK, N. Y., A CORPORATION OF DELAWARE.

PIPE-COUPLING.

1,310,740.   Specification of Letters Patent.   Patented July 22, 1919.

Application filed February 5, 1919. Serial No. 275,117.

*To all whom it may concern:*

Be it known that I, MICHAEL J. COFFEY, a citizen of the United States, residing at Freeport, in the county of Nassau and State of New York, have invented certain new and useful Improvements in Pipe - Couplings, of which the following is a specification.

This invention relates to couplings for pipes, and has for one object a construction whereby the pipe sections may be connected so as to permit relative movement between them without breaking the joint.

Another object of the invention is to provide a joint which will be tight under all conditions.

With these and other objects in view my invention consists of certain novel features of construction, combination and arrangement of parts as will be more fully described and pointed out in the appended claims.

Figure 1:
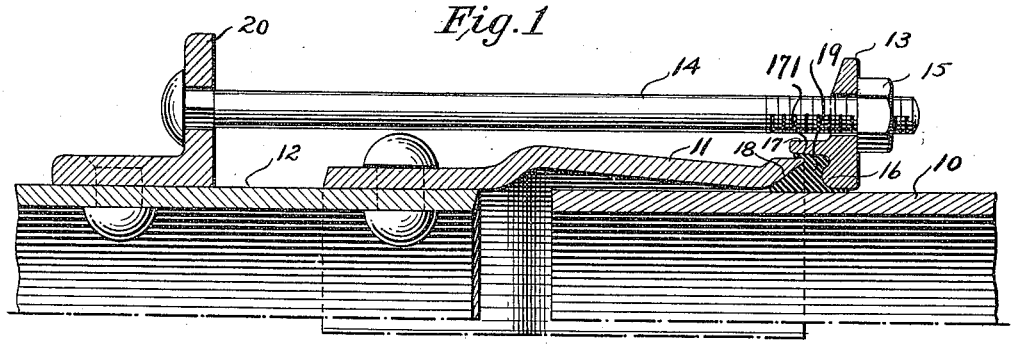
Figure 2:
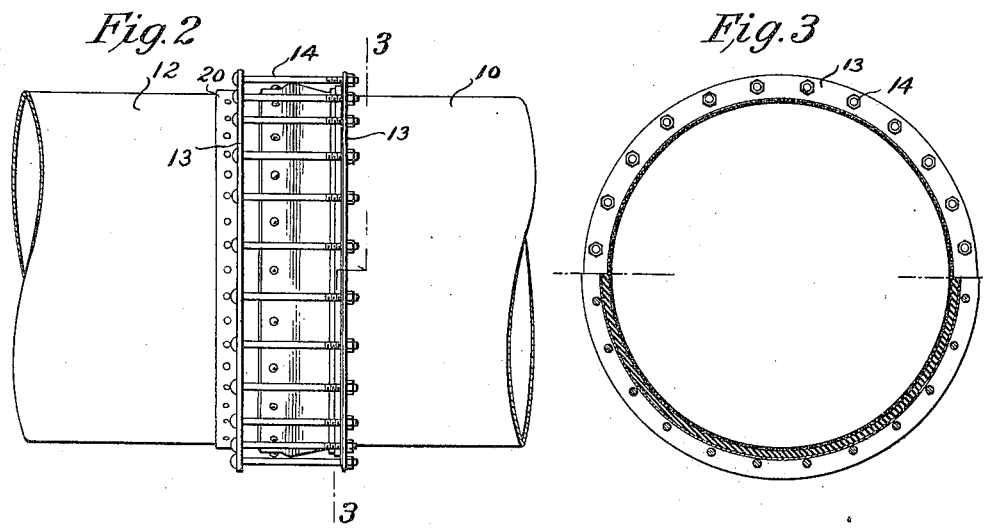
Figure 3:
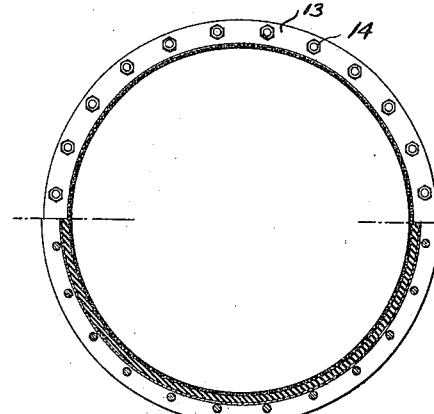
Figure 4:
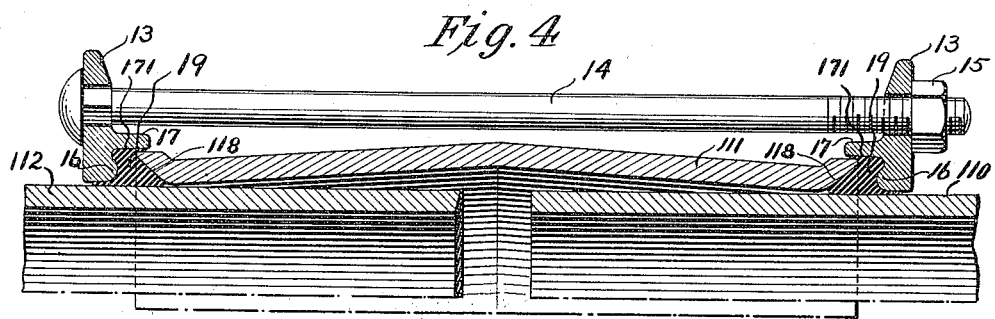

In the drawings, Figure 1 is a partial section through one form of joint which I have selected for purposes of illustration; Fig. 2 is a side elevation of a pair of pipe sections connected by the form of joint illustrated in Fig. 1; Fig. 3 is a sectional elevation on the line 3—3 of Fig. 2, and Fig. 4 is a sectional elevation of a modification of my novel form of joint.

The corresponding parts are referred to in both the drawings and in the specification by similar reference characters.

Referring first to the form of joint illustrated in Figs. 1, 2 and 3, 10 and 12 are the ends of the sections of pipe to be joined. A bell member 11 is riveted to the end of the section 12 so as to make a tight joint, and the end of the section 10 projects into the end of the bell member 11 and thus becomes the spigot member of the joint.

The end of the bell member 11 is flared outwardly to form a conical opening as 18, and preferably the bell member 11 is coned so that the diameter at its center is larger than at its end. It will be seen that this permits the spigot section 10 to be tilted without interference with the bell member.

In order to form a tight joint between the bell member and the spigot member I provide a rubber ring or gasket 19 and a follower ring 13. Bolts 14 provided with nuts 15 engage the follower ring 13 and the head of the bolt 14 is passed through a hole in a ring 20 also riveted to the pipe section 12. It will be seen that the tightening of the nuts 15 will force the follower ring 13 and the rubber gasket 19 against the conical surface 18 of the bell member 11.

In order to produce a tight joint I provide the follower ring 13 with a projecting ring portion 17 which is adapted to extend over or outside of the outer diameter of the bell member 11, this ring 17 having its inward face 171 angular. I also provide a projecting ring on the follower 13 as at 16, this ring being within the circumference of the bell member 11 and opposite the conical face 18. The internal diameter of the follower ring 13 is somewhat larger than the external diameter of the pipe section 10 so as to provide a clearance between them.

As the nuts 15 are tightened it will be seen that the follower ring will be forced toward the bell member 11, and that, by reason of the double projection on the follower ring 13 the rubber gasket 19 is compressed in a number of directions so as to produce a tight joint which will not be broken when the pipe 10 is moved either longitudinally or laterally. By reason of the conical face 171 the rubber is pinched between this face and the external surface of the end of the bell member as the follower is drawn toward the bell member. The projection 16 is in effect a double-faced projection, with one face extending upwardly and the other downwardly. As this projection is drawn against the gasket 19 a portion of the gasket will be forced downward against the pipe 10 and a portion will be forced upward against the conical face 18. The reaction from the motion of the follower 13 against the conical face 18 will also force the rubber of the gasket 19 downward against the section 10.

As originally inserted, the gasket will have a relatively straight face at its rear side next the follower, and Fig. 1 shows the direction in which the rubber will flow into the clearance space between the follower and the section 10 and between the face 171 and the outer diameter of the bell member 11.

While I have shown the bell member 11 as a separate piece, it will be obvious that it may be formed directly on the section 12.

Referring now to the modification shown in Fig. 4, such modification is substantially the same as the joint shown in Fig. 1, except that the bell member 11 is flared outwardly at the opposite ends, and a flexible joint is provided at each end instead of one end of the bell member being rigidly connected to one of the pipe sections, as in the form shown in Fig. 1. In Fig. 4, 11 is the bell member having each end flared as at 118 and coned so that its middle diameter is larger than either of the end diameters. This will permit either of the pipe sections 110 or 112 to be moved laterally or swung around the elastic joint without interference. A pair of the follower rings 13 are provided, one acting at each end of the bell member 11 against a gasket 171, precisely as has been previously described in reference to Fig. 1, bolts 14 passing through each of the followers, the nuts 15 serving to draw them together and to force their respective gaskets against the ends of the bell member 11.

What I claim and desire to secure by Letters Patent of the United States is:—

1. In a pipe joint of the kind described, a bell member, a spigot member adapted to enter the bell member, the interior surface of the bell member being flared outwardly at one end to form a conical opening, a follower ring surrounding the spigot member adjacent the end of the bell member, means to draw the follower ring toward the bell member, and a rubber gasket between the follower ring and the end of the bell member, the follower ring having an inner projecting ring portion located opposite the conical opening of the bell member and adapted to force the gasket against the conical surface of the bell member and also against the spigot member and an outer projecting ring portion extending over the outer edge of the end of the bell member and having a beveled inner surface against which the rubber gasket is pressed by the end of the bell member when the follower is drawn toward the bell member.

2. In a pipe joint of the kind described, a bell member, a pair of spigot members adapted to enter the ends of the bell member, the interior surface of each end of the bell member being flared outwardly to form a conical opening, a pair of follower rings, each surrounding one of the spigot members adjacent one of the ends of the bell member, means to draw the follower rings toward the bell member, a rubber gasket between each follower ring and one end of the bell member, each follower ring having an inner projecting ring portion located opposite the conical opening of the bell member and adapted to force the gasket against the conical surface of the bell member and also against the spigot member and an outer projecting ring portion extending over the outer edge of the end of the bell member and having a beveled inner surface against which the rubber gasket is pressed by the end of the bell member when the follower is drawn toward the bell member, the bell member being coned internally with the largest diameter at its center to permit the ends of the spigot members free movement laterally within the bell member.

3. In a pipe joint of the kind described, a pair of similar spigot members placed end to end and spaced apart, a bell member attached to one end of one of the first spigot members to form an extension thereof and extending over the end of the second spigot member, said bell member being coned adjacent the end of the first spigot member to permit the end of the second spigot member free movement laterally within the bell member, a follower ring surrounding the second spigot member adjacent the end of the bell member, a rubber gasket between the ends of the bell member and the follower ring, an abutment ring surrounding the first spigot member and attached thereto and both extending between the abutment ring and the follower ring and adapted to hold the rubber gasket between the follower ring and the end of the bell member.

MICHAEL J. COFFEY.

Copies of this patent may be obtained for five cents each, by addressing the "Commissioner of Patents, Washington, D. C."